(12) United States Patent
Rommer et al.

(10) Patent No.: US 9,344,960 B2
(45) Date of Patent: May 17, 2016

(54) SYSTEMS AND METHODS FOR SELECTING A GATEWAY GENERAL PACKET RADIO SERVICE (GPRS) SUPPORT NODE

(71) Applicant: TELEFONAKTIEBOLAGET L M ERICSSON (PUBL), Stockholm (SE)

(72) Inventors: Stefan Rommer, Västra Frölunda (SE); Ann-Christine Sander, Göteborg (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 14/638,540

(22) Filed: Mar. 4, 2015

(65) Prior Publication Data
US 2015/0181516 A1 Jun. 25, 2015

Related U.S. Application Data

(63) Continuation of application No. 12/991,476, filed as application No. PCT/EP2008/055739 on May 9, 2008, now Pat. No. 8,995,317.

(51) Int. Cl.
| H04W 48/18 | (2009.01) |
| H04W 48/00 | (2009.01) |
| H04L 29/12 | (2006.01) |
| H04W 60/04 | (2009.01) |
| H04W 8/26 | (2009.01) |
| H04W 76/02 | (2009.01) |
| H04W 80/04 | (2009.01) |

(52) U.S. Cl.
CPC ............. *H04W 48/18* (2013.01); *H04L 61/157* (2013.01); *H04L 61/1511* (2013.01); *H04L 61/3075* (2013.01); *H04W 48/17* (2013.01); *H04W 60/04* (2013.01); *H04W 8/26* (2013.01); *H04W 76/02* (2013.01); *H04W 80/04* (2013.01)

(58) Field of Classification Search
None
See application file for complete search history.

(56) References Cited

U.S. PATENT DOCUMENTS

| 7,984,149 | B1 * | 7/2011 | Grayson | H04L 65/1063 709/226 |
| 2004/0186850 | A1 | 9/2004 | Chowdhury | |
| 2006/0146803 | A1 * | 7/2006 | Bae | H04L 63/0869 370/352 |
| 2006/0258356 | A1 * | 11/2006 | Maxwell | H04L 29/12047 455/436 |
| 2007/0165655 | A1 | 7/2007 | Haumont | |

FOREIGN PATENT DOCUMENTS

| GB | 2373409 | A | * | 9/2002 | | |
| KR | GB 2373409 | A | * | 9/2002 | ......... | H04W 76/022 |
| WO | 2006086952 | A1 | | 8/2006 | | |

* cited by examiner

*Primary Examiner* — Andrew Lai
*Assistant Examiner* — Jamaal Henson

(57) ABSTRACT in one aspect, the present invention provides a method for selecting a GGSN. The method may include obtaining a network address for a home agent; transmitting a request to a name server for a name associated with the network address; receiving from the name server in response to the request a name associated with the network address; initiating a GPRS attachment; and after initiating the GPRS attachment, initiating a PDP context activation, wherein the step of initiating the PDP context activation comprises transmitting the name to an SGSN, and the SGSN is configured to use the name to lookup an IP address of a GGSN.

11 Claims, 3 Drawing Sheets

SYSTEMS AND METHODS FOR SELECTING A GATEWAY GENERAL PACKET RADIO SERVICE (GPRS) SUPPORT NODE

This application is a continuation of U.S. patent application Ser. No. 12/991,476, filed Nov. 8, 2010, which is a 371 of PCT/EP2008/055739 filed May 9, 2008, the disclosures of which are incorporated herein by reference.

TECHNICAL FIELD

The present invention relates generally to the field of mobile IP.

BACKGROUND

Many mobile stations (or "user equipment" (UE)) are now configured so as to be able to obtain access to the Internet, (or other IP network) through a variety of access networks. For example, a mobile station may obtain access to the Internet through a non-3GPP defined access network (e.g., a WLAN/WiFi network) and through a radio access network (RAN), such as a 3GPP RAN (e.g., a GSM/EDGE RAN (GERAN), UTRAN, etc.). In the rest of this document we will use Wireless LAN (WLAN) to exemplify a non-3GPP access technology. It should however be understood that other non-3GPP access technologies may be used as well.

When a mobile station accesses the internet using a WLAN access net-work, the mobile station may make use of a Home Agent (HA), and when a mobile station accesses the internet using a 3GPP access network, the mobile station may make use of a GRPS backbone network, which includes a Serving GPRS Support Node (SGSN) and a Gateway GPRS Support Node (GGSN). 3GPP is defining a solution for IP session continuity when a mobile station moves from accessing the Internet through a WLAN to accessing the Internet though a 3GPP RAN. To facilitate this IP session continuity, it has been proposed to collocate the HA function with the GGSN (e.g., provide a GGSN with software for implementing an HA).

One of the main benefits with combining HA and GGSN into a single node is that it is possible to avoid Mobile IP specific signaling and user plane overhead when a mobile station is accessing the Internet via GPRS. This is accomplished by treating the GPRS access as a "home link" for the mobile station. A "Home link" is a specific case for Dual Stack Mobile IPv6 (DSMIPv6) when the mobile station uses an access where the IP address allocated to the mobile station in that access is equal to the Home Address (HoA) allocated to the mobile station by the DSMIPv6 HA. Corresponding "home link" functionality is present also in other Mobile IP variants such as Mobile IPv6 (MIPv6) and Mobile IPv4 (MIPv4). DSMIPv6 is used in the descriptions of the embodiments but it should be understood that also other variants of Mobile IP may be used.

When a mobile station is using GPRS access, DSMIPv6 is not activated and IP access is provided to the mobile station using regular GPRS procedures only. When the mobile station is using WLAN access (e.g., I-WLAN access), the mobile station receives a Care-of Address (CoA) from the Packet Data Gateway PPDG) and connects to the HA function in GGSN/HA using DSMIPv6. The IP address assigned in GPRS (PDP address) is the same as the IP address assigned via DSMIPv6 (Home Address).

With the combined GGSN/HA it is required that the same GGSN/HA entity is selected when the mobile station is using GPRS and I-WLAN. One issue with this is that GGSN selection mechanisms are different from HA selection mechanisms.

GGSN selection in GPRS is done by the SGSN based on an Access Point Name (APN). APN information may be received from the HLR, from the mobile station or be preconfigured in the SGSN. Based on the information received from the mobile station, the HLR or that is preconfigured in the SGSN, the SGSN creates an APN string that is resolved in DNS. In the reply from DNS, the SGSN receives one or more IP addresses to GGSN(s) that support the requested APN.

HA selection for DSMIP6 may be done in different ways. One option specified for I-WLAN mobility is that the mobile station resolves a "HA APN" in DNS. Note that this DNS system is accessible to the mobile station and logically separate from the GPRS core network internal DNS system used by SGSN. In the reply from DNS, the mobile station receives one or more IP addresses to HA(s) that support the requested HA APN.

What is desired are systems and methods for selecting a support node so that the same GGSN/HA entity is selected when a mobile station transitions WLAN access to GPRS access.

SUMMARY

In one aspect, the present invention provides a method for selecting a support node (e.g., a GGSN or other support node). In some embodiments, the method includes: obtaining a network address for an agent (e.g., a Home Agent in a mobile IP system); transmitting a request to a name server (e.g., a domain name server or other name server) for a name associated with the network address; receiving from the name server in response to the request a name associated with the network address; initiating a network attachment (e.g., a GPRS attachment); and after initiating the network attachment, initiating a context activation (e.g., a PDP context activation), wherein the step of initiating the context activation comprises transmitting the name to a second support node (e.g., a SGSN). The second support node may be configured to select another support node (e.g., a GGSN) based on the received name. In some embodiments, the step of selecting the other support node based on the received name comprises transmitting a request to a second name server for a network address associated with the name. The second name server may be different than the first recited name server (e.g., the second name server may be a GPRS internal name server). The step of transmitting the request to the name server may be performed prior to the step of initiating the network attachment and The network address may be an Internet Protocol (IP) address.

In another aspect, the invention provides an improved mobile station. In some embodiments, the improved mobile station that is operable to: obtain a network address for an agent; access a network using the agent; transmit a request to a name server for a name associated with the network address; receive from the name server a name associated with the network address; initiate a network attachment; and after initiating the network attachment, transmit to a support node the name received from the name server. Preferably, the support node is configured to select another support node based on the received name.

In another aspect, the present invention provides an improved communication system. In some embodiments, the improved communication system includes: a GPRS network comprising an SGSN, a combined GGSN/HA node, and a first name server; and a second name server, wherein the second name server is configured to map a network address associated with the HA function of the combined GGSN/HA node to a name, and the first name server is configured to map the name to a network address associated with the GGSN function of combined GGSN/HA node.

The above and other aspects and embodiments of the present invention are described below with reference to the accompanying drawings.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

DETAILED DESCRIPTION

In one aspect, the present invention provides systems and methods for selecting a GGSN.

Figure 1:
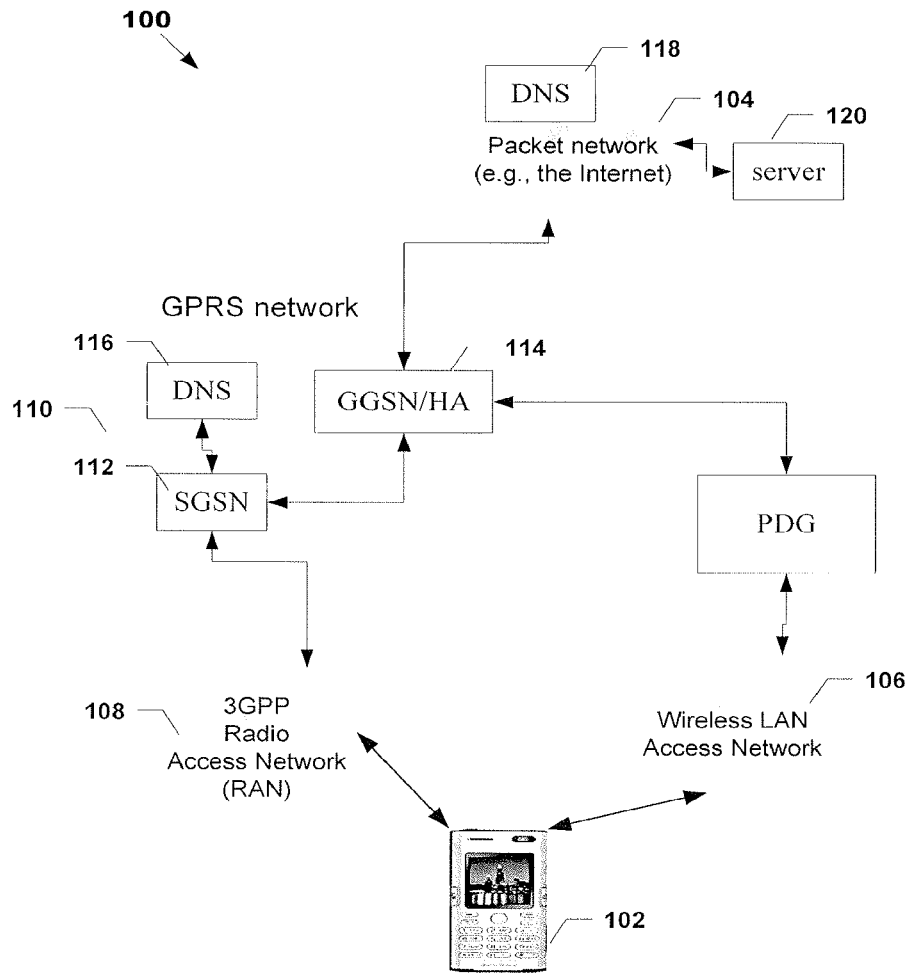
FIG. 1. illustrates a communication system according to embodiments of the invention.

Referring now to FIG. 1, FIG. 1 illustrates a communication system 100 according to an embodiment of the invention. More specifically, FIG. 1 illustrates a mobile station. 102 that can access a packet data network 104 (e.g., the Internet or other IP network; through a WLAN AN 106 and through a 3GPP RAN 108 and GPRS network 110. GPRS network 110 includes an SGSN 112, a GGSN/HA 114 (e.g., conventional GGSN with HA functionality added), and a domain name server (DNS) 116, A second domain name server 118 is accessible via network 104.

Figure 2:
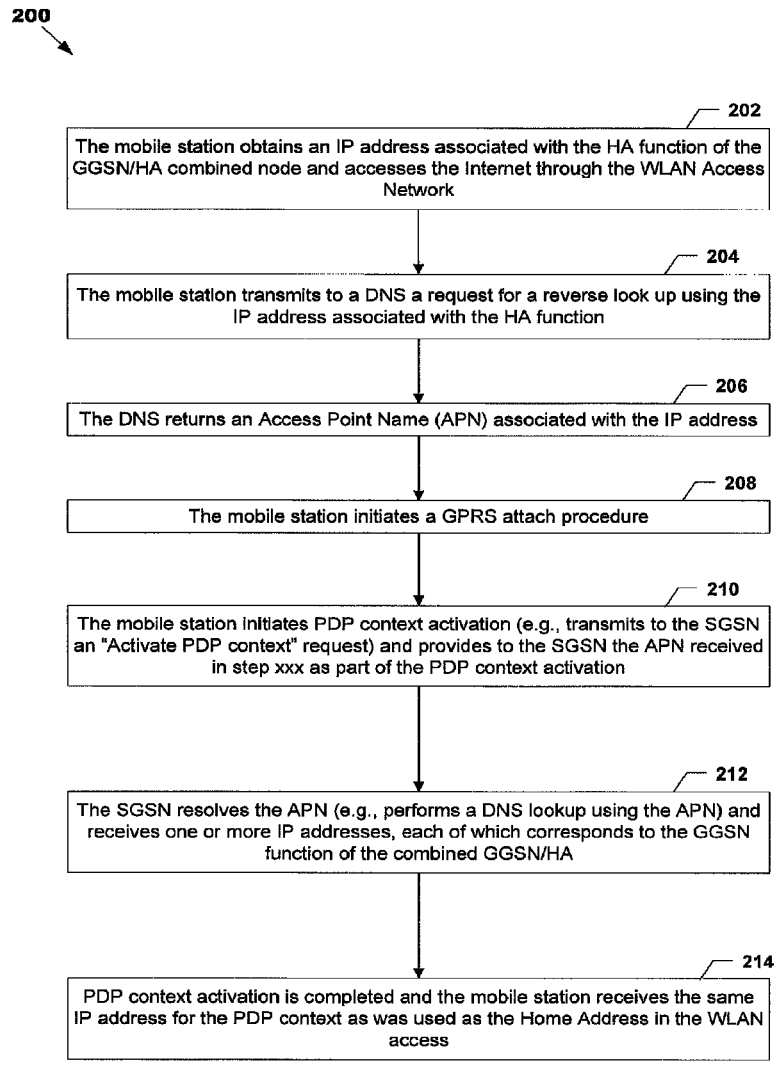
FIG. 2 is a flow chart illustrating a process according to some embodiments for selecting a GGSN.

Referring now to FIG. 2, FIG. 2 is a flow chart illustrating a process 200 for selecting a GGSN in the environment shown in FIG. 1. Process 200 may begin in step 202, where the mobile station (MS) 102 obtains an IP address associated with the HA function of the GGSN/HA 114 and accesses the network 104 through the WLAN Access Network 106, for example, MS 102 may establish an IP session with a server 120 connected to network 104.

In step 204, MS 102 transmits to DNS 118 a request for a reverse look up using the IP address associated with the HA function. That is, for example, MS 102 may transmit to DNS 118 a reverse look-up request message that includes the IP address associated with the HA function and causes DNS 118 to use the IP address to look-up in its database a name associated with the IP address. In step 206, DNS 118 returns a name associated with the IP address. The name may be an Access Point Name (APN).

In step 208, MS 102 initiates a GPRS attach procedure to connect to network 114. For example, while the IP session with server 120 is still active, MS 102 may have moved out of the coverage area of network 106 and into the coverage area of network 108, thereby causing MS 102 to initiate the GPRS attach procedure.

In step 210, MS 102 initiates PDF context activation (e.g., MS 102 transmits to SGSN 112 an "Activate PDP context" request) and provides to SGSN 112 the name received in step 118 as part of the PDP context activation.

In step 212, SGSN 112 resolves the name (e.g., performs a DNS lookup using the name) and receives one or more IP addresses, each of which corresponds to the GGSN function of the combined GGSN/HA 114. For example, in step 212, SGNS 112 may transmit, a network address lookup request to DNS 116, which request includes the name received from MS 102 as part of the PDP context activation.

In step 214, the PDF context activation is completed, and the mobile station receives the same IP address for the PDP context, as was used as the Home Address in the WLAN access.

In this manner, the SGSN 112 will select the same GGSN/HA entity that was used by MS 102 when MS 102 had Internet access through network 106.

Figure 3:
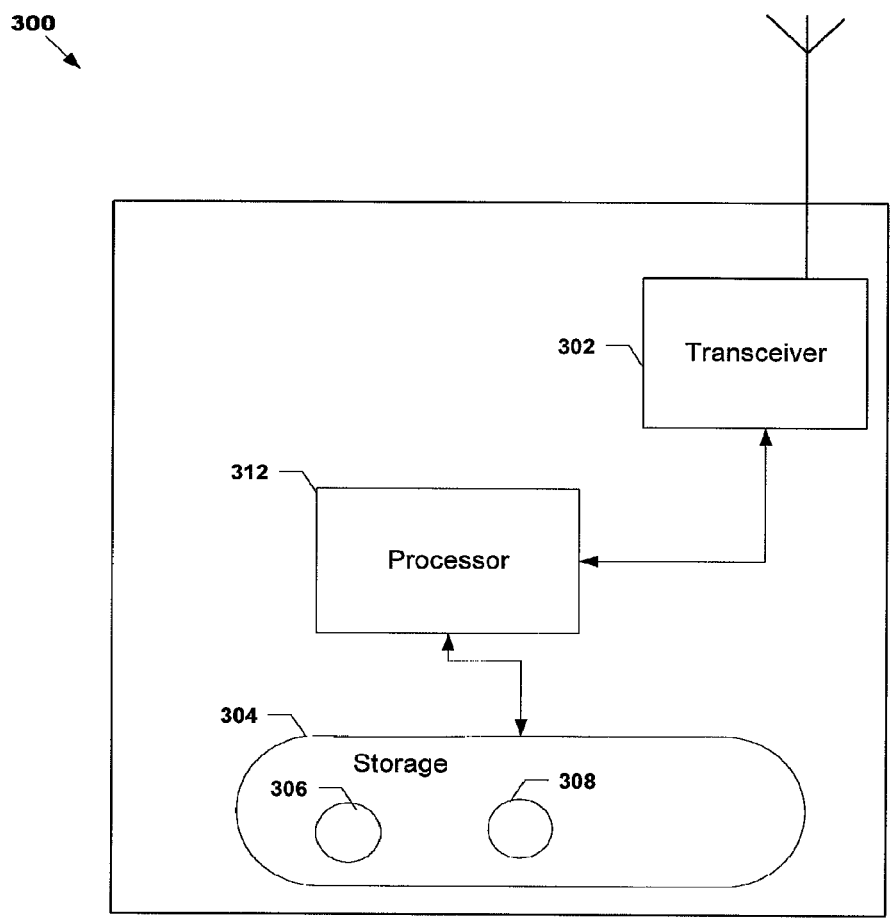
FIG. 3 is a functional block diagram of a mobile station (MS) according to embodiments of the invention.

Referring now to FIG. 3, FIG. 3 further illustrates MS 102 according to some embodiments of the invention.

As illustrated in FIG. 3, MS 102 includes: (1) a transceiver 302 for transmitting and receiving data; (2) a storage device 304 (e.g., non-volatile memory) for storing, among other things, an name 306 received from the name server 118 in response to a reverse look-up request and software 308 for causing the device 102 to perform the functions described herein and illustrated in the flow chart of FIG. 2.

While various embodiments/variations of the present invention have been described above, it should be understood that they have bean presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A method in a mobile station for selecting a combined Gateway General packet radio service Support Node/Home Agent, GGSN/HA, node when accessing the internet using a Wireless Local Area Network, WLAN, access network and when using a General Packet Radio Service, GPRS, network, the method comprising:

obtaining, at the mobile station accessing internet using the WLAN access network, a network address for a HA function of the combined GGSN/HA node;

transmitting, from the mobile station, a request to a name server for a name associated with the network address for the HA function of the combined GGSN/HA node;

receiving, at the mobile station, from the name server in response to the request, the name associated with the network address for the HA function;

initiating, at the mobile station, a GPRS network attachment; and after initiating the GPRS network attachment, initiating, at the mobile station, a context activation, wherein the step of initiating the context activation comprises transmitting, from the mobile station, the name associated with the network address for the HA function to a Serving GPRS Support Node, SGSN, wherein the SGSN is configured to select the same combined GGSN/HA node based on the received name when the mobile station accesses the internet using the GPRS network.

2. The method of claim 1, wherein the step of selecting the combined GGSN/HA node based on the received name comprises transmitting a request to a second name server for a network address associated with the name.

3. The method of claim 2, wherein the second name server is different than the first recited name server.

4. The method of claim 1, wherein the step of transmitting the request to the name server is performed prior to the step of initiating the GPRS attachment.

5. The method of claim 1, wherein the step of initiating a network attachment comprises initiating a GPRS attachment, and the step of initiating a context activation comprises initiating a Packet Data Protocol, PDP, context activation.

6. A mobile station for selecting a combined Gateway General packet radio service Support Node/Home Agent, GGSN/HA, node when accessing the internet using a Wireless Local Area Network, WLAN, access network and when using a General Packet Radio Service, GPRS, network, wherein the mobile station is operable to:
  obtain a network address for a HA function of the combined GGSN/HA node, the HA function being used by the mobile station to access internet using the WLAN access network;
  access the internet using the HA function of the combined GGSN/HA node;
  transmit a request to a name server for a name associated with the network address for the HA function of the combined GGSN/HA node;
  receive from the name server, in response to the request, a name associated with the network address for the HA function;
  initiate a GPRS network attachment; and
  after initiating the GPRS network attachment, transmit to a Serving GPRS Support Node, SGSN the name associated with the network address for the HA function and received from the name server; and
  wherein the SGSN is configured to select the same combined GGSN/HA node based on the received name when the mobile station accesses the internet using the GPRS network.

7. The mobile station of claim 6, wherein the mobile station is configured to transmit the request to the name server prior to initiating the network attachment.

8. The mobile station of claim 6, wherein the name server is configured to map the network address to a name.

9. The mobile station of claim 8, wherein the network address is an Internet Protocol, IP, address.

10. A communication system, comprising:
  a mobile station, and
  a General Packet Radio Service, GPRS, network comprising an Serving GPRS Support Node, SGSN, a combined Gateway GPRS Support Node/Home Agent, GGSN/HA, node, a first name server, and a second name server,
  wherein the mobile station is operable to:
    obtain a network address for a HA function of the combined GSN/HA node, the HA function being used by the mobile station to access internet using a Wireless Local Area Network, WLAN, access network;
    access the internet using the HA function of the combined GGSN/HA node;
    transmit a request to the first name server for a name associated with the network address for the HA function of the combined GGSN/HA node;
    receive from the first name server, in response to the request, the name associated with the network address for the HA function;
    initiate a GPRS network attachment; and
    after initiating the GPRS network attachment, transmit to the SGSN the name associated with the network address for the HA function and received from the first name server;
  wherein the SGSN is configured to select the same combined GGSN/HA node based on the received name when the mobile station accesses the internet using the GPRS network,
  wherein the second name server is configured to map a network address associated with the HA function of the combined GGSN/HA node to the name, and
  wherein the first name server is configured to map the name to a network address associated with the GGSN function of combined GGSN/HA node.

11. The communication system of claim 10, wherein the name servers are Domain Name Servers, DNSs.

* * * * *